United States Patent
Mueller-Hagedorn et al.

(10) Patent No.: US 8,741,180 B2
(45) Date of Patent: Jun. 3, 2014

(54) PROCESS AND BURNER FOR PRODUCING SYNTHESIS GAS

(75) Inventors: Matthias Mueller-Hagedorn, Karlsruhe (DE); Holger Schlichting, Hofheim (DE); Guenther Heinz, Selters (DE)

(73) Assignee: Lurgi GmbH, Frankfurt am Main (DE)

( * ) Notice: Subject to any disclaimer, the term of this patent is extended or adjusted under 35 U.S.C. 154(b) by 0 days.

(21) Appl. No.: 13/521,335

(22) PCT Filed: Nov. 12, 2010

(86) PCT No.: PCT/EP2010/006906
§ 371 (c)(1),
(2), (4) Date: Jul. 10, 2012

(87) PCT Pub. No.: WO2011/085744
PCT Pub. Date: Jul. 21, 2011

(65) Prior Publication Data
US 2012/0298922 A1 Nov. 29, 2012

(30) Foreign Application Priority Data
Jan. 16, 2010 (DE) .......................... 10 2010 004 787

(51) Int. Cl.
*C01B 3/32* (2006.01)
*F23D 14/78* (2006.01)
*F23D 14/58* (2006.01)

(52) U.S. Cl.
USPC ............................ 252/373; 431/160; 431/354

(58) Field of Classification Search
None
See application file for complete search history.

(56) References Cited

U.S. PATENT DOCUMENTS

| 3,705,108 A | | 12/1972 | Marion et al. |
|---|---|---|---|
| 4,386,941 A | * | 6/1983 | Crouch et al. ............. 48/197 R |
| 4,491,456 A | | 1/1985 | Schlinger et al. |
| 5,261,602 A | | 11/1993 | Brent et al. |
| 5,692,890 A | * | 12/1997 | Graville ........................... 431/9 |
| 2003/0085385 A1 | | 5/2003 | Stellaccio et al. |
| 2003/0095920 A1 | | 5/2003 | Schlichting et al. |

FOREIGN PATENT DOCUMENTS

| DE | 69319906 | 12/1998 |
|---|---|---|
| DE | 10156980 | 6/2003 |
| WO | 95/32148 | 11/1995 |
| WO | 2008/065182 | 6/2008 |

OTHER PUBLICATIONS

PCT International Preliminary Report on Patentability, mailed Aug. 16, 2012, from International Application No. PCT/EP2010/006906, corresponding to this U.S. Appl. No. 13/521,335, pp. 1-8.
PCT International Search Report (English translation), from International Application No. PCT/EP2010/006906, mailed Apr. 21, 2011, corresponding to this new filing, 3 pages.

* cited by examiner

*Primary Examiner* — Melvin C Mayes
*Assistant Examiner* — Douglas Call
(74) *Attorney, Agent, or Firm* — Pauly, Devries Smith & Deffner, LLC

(57) ABSTRACT

This invention relates to the production of synthesis gas by partial oxidation of liquid or gaseous, carbonaceous fuel in the presence of an oxygen-containing oxidant, wherein the fuel, the oxidant and a moderator are separately supplied to a burner and wherein the fuel and the moderator are mixed in a mixing chamber of the burner, before they are brought in contact with the oxidant. To reduce the load of the burner in particular during operation with transient conditions, the oxidant is centrally introduced through an outlet opening of the burner into a combustion chamber and the mixture of fuel and moderator is introduced through the outlet opening into the combustion chamber concentrically around the oxidant.

10 Claims, 1 Drawing Sheet

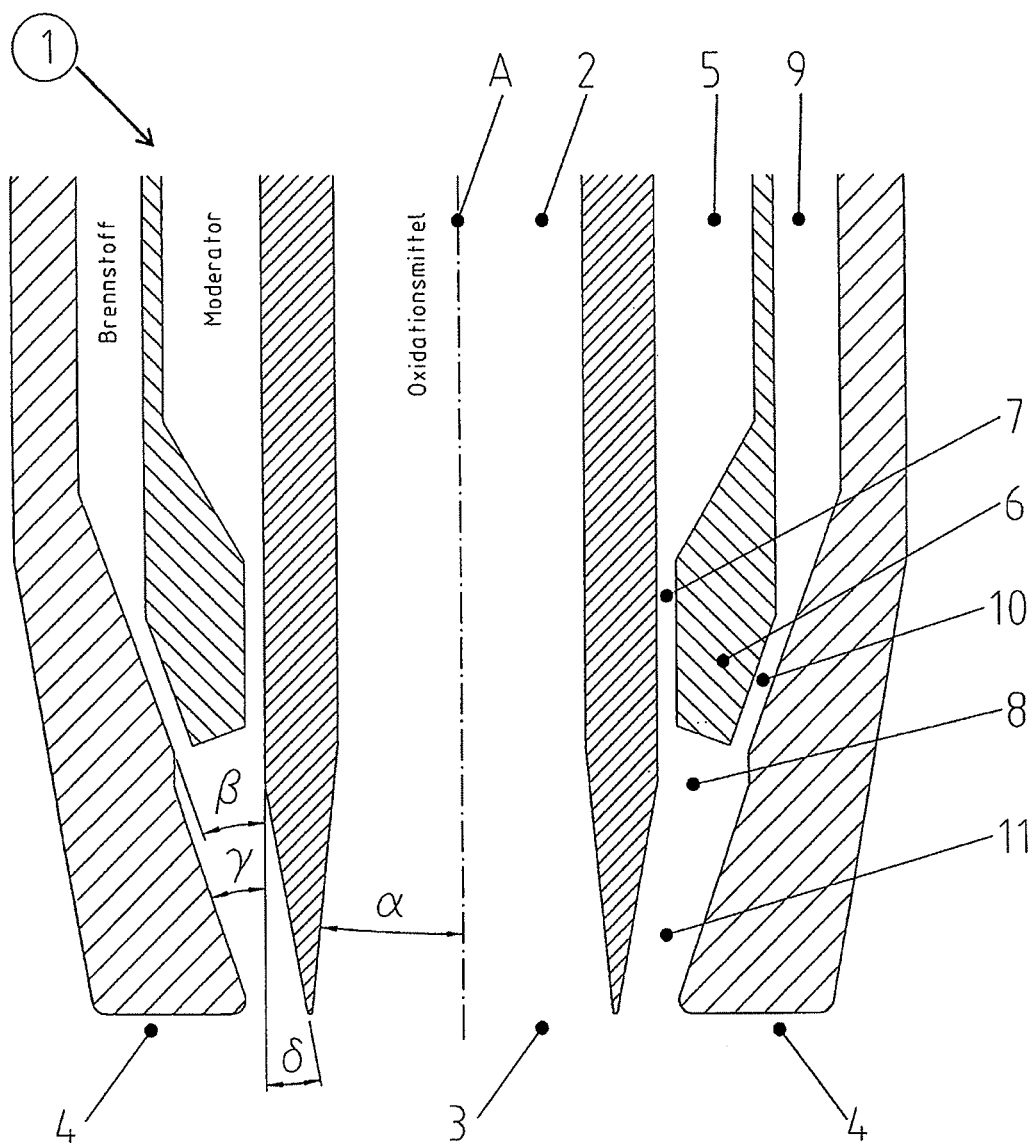

PROCESS AND BURNER FOR PRODUCING SYNTHESIS GAS

CROSS-REFERENCE TO RELATED APPLICATIONS

This application is a national stage application under 35 U.S.C. 371 of International Patent Application Serial No. PCT/EP2010/006906, entitled "Process and Burner for Producing Synthesis Gas," filed Nov. 12, 2010, which claims priority from German Patent Application No. 10 2010 004 787.2, filed Jan. 16, 2010, the disclosures of which are hereby incorporated by reference herein in their entirety.

FIELD OF THE INVENTION

This invention relates to a process and a burner for producing synthesis gas by partial oxidation of liquid or gaseous, carbonaceous fuel in the presence of an oxygen-containing oxidant, wherein the fuel, the oxidant and a moderator are separately supplied to a burner and wherein the fuel and the moderator are mixed in a mixing chamber of the burner, before they are brought in contact with the oxidant.

BACKGROUND OF THE INVENTION

Hydrogen-containing gas mixtures generally are referred to as synthesis gases, which are employed in various synthesis reactions. Examples include the methanol synthesis, the production of ammonia by the Haber-Bosch process or the Fischer-Tropsch synthesis. Synthesis gases can be produced from solid, liquid or gaseous starting materials.

Processes and apparatuses for producing synthesis gas are known in principle in the prior art. For example, a number of different technical approaches exist, in which liquid or gaseous, carbonaceous fuels with a moderator consisting of steam, carbon dioxide or a mixture thereof are partially oxidized with an oxygen-containing gas. The outlet opening of the used burner is directed into a combustion chamber.

WO 2008/065182 A1 discloses a process for producing synthesis gas, in which a burner is provided with a plurality of nozzle openings, so that a hydrocarbon fuel is guided through the burner separate from an oxidizing gas. The hydrocarbon fuel and the oxidizing gas are separated from each other by a lead-through for a moderator gas. The exit velocity of the moderator gas is greater than the exit velocity of the oxidizing gas.

U.S. 2003/0085385 A1 describes a process in which the reactants hydrocarbon fuel, steam, oxygen and recycled water are guided to the nozzle of a four-stream injector in separate channels. By means of the arrangement, a better conversion of the hydrocarbon fuel should be achieved.

In the process for producing synthesis gas known from WO 95/32148 A, nozzle corrosion should be avoided in that hydrocarbon fuel and oxidant run away from the nozzle in parallel separated by a moderator and there is no mixing of moderator and fuel.

In these known burners at least three outlet openings are present at the burner throat and the atomization of the fuel is effected outside the burner. In the case of an external atomization of the fuel, high relative velocity differences of the reactants exiting adjacent to each other are necessary at the burner throat, in order to perform the necessary atomization work. These high exit velocities of the moderator and/or of the oxidant generate extensive reaction zones. In addition, a high input of energy takes place via the conveying devices (e.g. pumps). Therefore, the nozzle outlet openings must be cooled in particular under transient conditions, such as in start-up and shut-down operations. In the prior art, a great problem also is premature material wear or the removal of material at the burner throat.

In the process for producing synthesis gas by partial oxidation of liquid or gaseous fuels in the presence of oxygen, which is described in DE 101 56 980 B4, the fuel, the oxygen-containing gas and an atomizing medium are separately supplied to the burner, and the atomizing medium is expanded via one or more nozzles directly before the central orifice opening for the fuel. The oxygen-containing gas is guided past the outside of the atomizing nozzle and enters the reactor space concentrically around the mixture of fuel and atomizing medium. This results in exothermal reactions in the vicinity of the burner head, which under transient conditions leads to a great thermal load of the reactor wall in the region of the burner.

SUMMARY OF THE INVENTION

Against this background it is the object underlying the invention to propose an alternative burner which in particular in operation with transient conditions is exposed to smaller loads.

In a process as mentioned above, this object substantially is solved by the invention in that the oxidant is centrally introduced through an outlet opening of the burner into a combustion chamber and that the mixture of fuel and moderator is introduced through the outlet opening into the combustion chamber concentrically around the oxidant.

Surprisingly, it was found that by reversed media guidance as compared to the prior art the temperature distribution in the reaction space can be influenced favorably and hence the thermal load of the reactor wall and the burner components is reduced. By guidance of the media in accordance with the invention, the oxidant (oxygen, air) is shielded against the synthesis gas present in the combustion chamber.

As a result, exothermal reactions in the vicinity of the burner throat can be suppressed.

To achieve a sufficient atomization and intermixing with the fuel, it is proposed in accordance with a development of the invention to inject the moderator into the mixing chamber with a velocity of 30 m/s to 200 m/s, preferably 80 m/s to 140 m/s. Advantageously, steam, carbon dioxide or a mixture thereof, possibly by adding a combustible gas, is used as moderator.

In accordance with the invention, intermixing with the moderator is promoted in that the fuel is guided towards the moderator jet at an angle β of 10° to 80°, preferably 40° to 60°, with respect to the burner axis. To achieve an efficient atomization, the exit velocity of the mixture of fuel and moderator from the mixing chamber is 30 m/s to 100 m/s, in accordance with one aspect of the invention.

In accordance with a development of the invention it is provided that the fuel is supplied to the combustion chamber through several burners, which can be integrated in a common housing. In accordance with the invention the possibility exists to supply a different fuel to each burner and thereby selectively influence the reaction conditions in the combustion chamber.

The present invention also relates to a burner for producing synthesis gas, which is suitable for performing the process of the invention. Such burner includes a central supply channel for supplying the oxidant, a mixing chamber surrounding the central supply channel, into which the supply conduits for the fuel and a moderator open, and an outlet duct via which the mixture of fuel and moderator from the mixing chamber is supplied to an outlet opening of the burner. In accordance with the invention, the outlet duct is concentrically arranged around the central supply channel for the oxidant.

To accelerate the moderator, the supply conduit for the moderator preferably opens into the mixing chamber via a constricted annular gap.

In accordance with a development of the burner of the invention, the supply conduit for the fuel meets with the moderator jet guided coaxially with respect to the central supply channel for the oxidant at an angle β of 10° to 80°, preferably 40° to 60°, with respect to the burner axis. In the mixing chamber, the liquid fuel thereby is intensively mixed with the moderator, wherein it is divided into fine/small droplets.

Preferably, the outlet duct tapers towards the outlet opening. The atomized fuel thereby is deflected towards the central oxidant jet and in addition accelerated once again shortly before exiting into the combustion space. Due to the taper of the outlet opening, wetting of the outer fuel duct wall necessarily is effected, so that the same is intensively cooled by the fuel.

In accordance with a development of the invention, an angle γ of the outer fuel duct wall with respect to the burner axis and an angle δ of the inner fuel duct wall with respect to a line parallel to the burner axis are chosen such that the angle γ is greater than the angle δ. Both angles preferably lie in the range from 0 to 20° and in particular between 0 and 10°.

In accordance with a preferred aspect of the invention the central supply channel for the oxidant is expanded in the region of the outlet opening with an angle α of 0° to 45°, preferably 0° to 10°, with respect to the burner axis, in order to achieve a broadened injection into the combustion space.

In accordance with the invention, the burner is surrounded by a cooling-water jacket. When several burners are provided, the same can also be jacketed together.

Further developments, advantages and possible applications of the invention can also be taken from the following description of embodiments and the drawing. All features described and/or illustrated form the subject-matter of the invention per se or in any combination, independent of their inclusion in the claims or their back-references.

BRIEF DESCRIPTION OF THE FIGURE

FIG. 1 shows part of a burner of the invention in a schematic sectional representation.

DETAILED DESCRIPTION

The burner 1 partly shown in the drawing includes a central supply channel (tube) 2 through which the oxidant, preferably technically pure, compressed and preheated oxygen, is delivered to the outlet opening 3 in the burner base plate 4. In the front region of its orifice into the non-illustrated combustion chamber of the reactor for producing synthesis gas, the central supply channel 2 is slightly expanded with an angle α of 0° to 45°, preferably 0° to 10°, with respect to the burner axis A. Hence, the largest inside diameter of the central supply channel 2 is achieved at the orifice into the combustion chamber. Depending on the application, the exit surface offered by the central supply channel 2 for the oxidant each is calculated such that an exit velocity of the oxidant of 40 m/s to 140 m/s, preferably 60 m/s to 100 m/s, is realized.

Coaxially to the central oxidant supply through the supply channel 2, the moderator is guided via a supply conduit 5 to a two-component atomizing nozzle 6. The moderator consists of steam, carbon dioxide or a mixture thereof. If necessary and available, a combustible gas can also be added to the moderator. In the atomizing nozzle 6, the moderator is accelerated by an annular gap 7 such that it reaches velocities of 30 m/s to 200 m/s, preferably 80 m/s to 140 m/s. These values are calculated for pure steam as moderator. When using carbon dioxide, a mixture of steam and carbon dioxide, or when admixing a combustible gas, the velocity to be achieved and hence the gap size of the annular gap 7 is calculated corresponding to the pulse flow of pure steam with the indicated velocity range to be achieved.

In downstream direction, the moderator accelerated in the annular gap 7 enters into a mixing chamber 8 surrounding the central supply channel 2, where it meets with a laterally supplied fuel jet. As fuel, liquid or gaseous carbonaceous media are used, e.g. fuel oil or natural gas. The term liquid in the sense of the present invention also covers suspensions (slurries) in which solids are suspended in the liquid.

In the upper part of the burner 1, the fuel jet initially is guided coaxially to the moderator through a supply conduit 9, before it enters into the mixing chamber 8 through a bore or conical supply channel 10 inside the atomizing nozzle 6 at an angle β of 10° to 80°, preferably 40° to 60°, with respect to the burner axis A. In accordance with the invention, exit velocities of 10 m/s to 50 m/s, preferably of 10 m/s to 30 m/s, into the mixing chamber 8 are achieved thereby.

The mixing chamber 8 serves to accomplish an intensive mixing between the liquid fuel and the moderator and thereby divide the fuel into droplets. Via an outlet duct 11, the mixing chamber 8 leads to the outlet opening 3 of the burner 1, wherein the outlet duct 11 preferably tapers towards the outlet opening 3. This taper is effected by choosing the two angles γ and δ, wherein the angle γ is equal to or greater than the angle δ. γ represents the angle of the outer fuel duct wall with respect to the burner axis and lies in the range from 0 to 20°, preferably from 0 to 10°. The angle δ between the inner fuel duct wall and a line parallel to the burner axis likewise lies in the range from 0 to 20°, preferably from 0 to 10°. The axial length of the mixing chamber 8 and of the outlet duct 11 up to the outlet opening 3 altogether is 10 mm to 300 mm, preferably 20 mm to 200 mm. Due to the taper of the outlet duct 11, the atomized fuel is deflected towards the central oxidant jet and in addition accelerated once again shortly before exiting into the combustion chamber. Due to the taper of the outlet duct 11, the outer fuel duct wall necessarily is wetted, so that the same can be cooled intensively by the fuel. The outlet velocity of the moderator-fuel mixture is 30 m/s to 100 m/s and hence lies in a similar order of magnitude as the exit velocity of the oxidant jet. Usually, the burner 1 is surrounded by a cooling-water jacket, which is not shown, however, in the FIGURE for simplification.

The velocity profile of the reaction media formed by the inventive arrangement and procedure at the burner base plate 4 and in its direct surroundings has the advantage that the recirculation of hot cracking gas from the combustion chamber in the outer region of the burner only meets with the atomized fuel. Hence, only endothermal or largely thermal neutral reactions are possible, which prevent a direct release of heat in the direct surroundings of the burner base plate 4. In addition, a coking layer is formed in the outer region of the outlet opening 3, which represents an additional thermal insulation for the introduced thermal radiation.

To vary the velocity profile at the outlet opening 11 of the burner 1 or to expand the load range of the burner 1, a certain amount of moderator can be admixed to the oxidant already outside the burner 1.

The burner 1 of the present invention is designed for gasification pressures in the combustion chamber of 10 bar to 120 bar at temperatures in the combustion chamber of 1000° C. to 1600° C. on average.

The burner 1 of the present invention can be accommodated in a common housing alone or as an arrangement of several burners 1, wherein the fuel is passed through the one or more burners 1 into the combustion chamber. As an alternative, a plurality of individual burners 1 in accordance with the present invention can be installed in the combustion chamber, wherein the fuel, the moderator and the oxidant then are suitably distributed over the individual burners 1.

As an alternative embodiment, the process of the invention can also be operated with a gaseous or supercritical, carbonaceous fuel (e.g. methane). In the burner of the invention, the two-component atomizing nozzle 6 then can be omitted, since an atomization of the fuel no longer is necessary. For this case, the burner can be designed more simple, since the moderator and the fuel can be introduced into the burner already in the mixed condition. In this alternative embodiment, the exit velocity for the oxidant and the reducing agent towards the combustion space as well as the angles γ and δ remain unchanged.

Due to the invention it is possible to process liquid fuels, in particular heavy oils and heavy viscous residues from refining plants, to synthesis gas by partial oxidation. The fuel initially is divided into droplets and intensively mixed with the moderator, before this mixture gets in contact with the oxygen-containing oxidant. By this media guidance it is ensured that the burner components facing the combustion chamber are cooled well by said media. This cooling in particular also takes place in operating conditions in which a cooling medium is not available.

EXAMPLES

A burner 1 of the invention was designed for a nominal throughput of up to 500 kg/h of liquid feedstock and tested with the process of the invention in a pilot plant.

Example 1

As liquid fuel, EL Fuel Oil (extra-light fuel oil) with an operating temperature of 20° C. and a kinematic viscosity (under operating conditions) of about 6 mm$^2$/s was used. The oxidant was technically pure oxygen with a temperature of 250° C. As moderator, steam with a temperature of 310° C. was used. In the combustion chamber, a pressure of 61 bar existed. As cracking gas temperature at the burning chamber outlet 1410° C. were determined. The velocities of the reaction media were determined as follows: Exit velocity of the oxidant 90 m/s, velocity of the moderator steam in the two-component atomizing nozzle 9 120 m/s, velocity of the fuel EL fuel oil in the two-component atomizing nozzle 9 20 m/s.

The composition of the cracking gas achieved in this example was found to be 3.9% $CO_2$, 47.7% CO and 48.9% $H_2$ (in mole percent, dry).

Example 2

As liquid fuel, Intermediate Fuel Oil IFO 380 SA (generally a mixture of heavy oil and diesel oil) with an operating temperature of 90° C. and a kinematic viscosity (under operating conditions) of about 120 mm$^2$/s was used. The oxidant was technically pure oxygen with a temperature of 245° C. As moderator, steam with a temperature of 290° C. was used. In the combustion chamber, a pressure of 51 bar existed. As cracking gas temperature at the burning chamber outlet 1410° C. were determined. The velocities of the reaction media were determined as follows: Exit velocity of the oxidant 80 m/s, velocity of the moderator steam in the two-component atomizing nozzle 9 90 m/s, velocity of the fuel Intermediate Fuel Oil in the two-component atomizing nozzle 9 14 m/s.

The composition of the cracking gas achieved in this example was found to be 3.5% $CO_2$, 50.3% CO and 45.8% $H_2$ (in mole percent, dry).

LIST OF REFERENCE NUMERALS

1 burner
2 central supply channel
3 outlet opening
4 burner base plate
5 supply conduit for moderator
6 two-component atomizing nozzle
7 annular gap
8 mixing chamber
9 supply conduit for fuel
10 bore/conical duct
11 outlet duct
A burner axis
α angle between outlet opening expansion and burner axis
β angle between fuel jet and burner axis
γ angle between outer outlet duct wall and burner axis
δ angle between inner outlet duct wall and a line parallel to the burner axis

The invention claimed is:

1. A process for producing synthesis gas by partial oxidation of liquid or gaseous carbonaceous fuel with an oxygen-containing oxidant, wherein the fuel, the oxidant and a moderator are separately supplied to a burner and wherein the fuel and the moderator are mixed in a mixing chamber of the burner, before they are brought in contact with the oxidant, wherein the oxidant is centrally introduced into a combustion chamber through an outlet opening of the burner and the mixture of fuel and moderator is introduced through the outlet opening into the combustion chamber concentrically around the oxidant,
    wherein a burner axis and an outer fuel duct wall of the mixing chamber form an angle γ, and
    a reference line parallel to the burner of the axis and an inner fuel duct wall of the mixing chamber form an angle δ, wherein the angle γ is greater than the angle δ.

2. The process according to claim 1, wherein the moderator is injected into the mixing chamber with a velocity of 30 m/s to 200 m/s.

3. The process according to claim 1, wherein steam, carbon dioxide or a mixture thereof is used as moderator.

4. The process according to claim 1, wherein the fuel is guided towards the moderator at an angle of 10° to 80° with respect to the burner axis.

5. The process according to claim 1, the exit velocity of the mixture of fuel and moderator from the mixing chamber is 30 m/s to 100 m/s.

6. The process according to claim 1, wherein the fuel is supplied to the combustion chamber through a plurality of burners.

7. The process according to claim 6, wherein a different fuel is supplied to each burner.

8. The process according to claim 1, wherein the moderator is injected into the mixing chamber with a velocity of 80 m/s to 140 m/s.

9. The process according to claim 1, wherein a combustible gas is a moderator.

10. The process according to claim 1, wherein the fuel is guided towards the moderator jet at an angle of 10° to 60° with respect to the burner axis.

\* \* \* \* \*